(12) United States Patent
Haneda et al.

(10) Patent No.: US 9,464,731 B2
(45) Date of Patent: Oct. 11, 2016

(54) PRESSURE REDUCING VALVE

(71) Applicant: JTEKT CORPORATION, Osaka-shi, Osaka (JP)

(72) Inventors: Kazuo Haneda, Toyota (JP); Toshikatsu Kubo, Kariya (JP); Eiji Okawachi, Toyota (JP); Akira Yamashita, Toyota (JP)

(73) Assignees: JTEKT CORPORATION, Osaka-shi (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 231 days.

(21) Appl. No.: 14/093,214

(22) Filed: Nov. 29, 2013

(65) Prior Publication Data
US 2014/0158237 A1    Jun. 12, 2014

(30) Foreign Application Priority Data

Dec. 10, 2012    (JP) ................................ 2012-269328

(51) Int. Cl.
*G05D 16/10*    (2006.01)
*F16K 51/00*    (2006.01)

(52) U.S. Cl.
CPC .............. *F16K 51/00* (2013.01); *G05D 16/10* (2013.01); *Y10T 137/87265* (2015.04)

(58) Field of Classification Search
CPC .................. Y10T 137/7822; Y10T 137/7823; Y10T 137/7825; Y10T 137/7826; G05D 16/10; G05D 16/103; G05D 16/106; F16K 51/00
USPC ............. 137/505.38, 505.39, 505.41, 505.42
See application file for complete search history.

(56) References Cited

U.S. PATENT DOCUMENTS

| 2,103,576 | A | * | 12/1937 | Dockson | G05D 16/0663 |
| | | | | | 137/505.18 |
| 4,693,267 | A | * | 9/1987 | Patterson | G05D 16/10 |
| | | | | | 137/116.5 |
| 4,719,940 | A | * | 1/1988 | Beavers | G05D 16/0663 |
| | | | | | 137/505.39 |
| 4,793,379 | A | * | 12/1988 | Eidsmore | F16K 1/306 |
| | | | | | 137/460 |
| 6,155,290 | A | * | 12/2000 | Nakajima | G05D 16/0655 |
| | | | | | 137/505.41 |
| 2004/0099313 | A1 | | 5/2004 | Gotthelf | |
| 2005/0257836 | A1 | | 11/2005 | Boyer et al. | |
| 2012/0241662 | A1 | | 9/2012 | Clifford et al. | |

FOREIGN PATENT DOCUMENTS

JP    A-2011-108057    6/2011

OTHER PUBLICATIONS

Jul. 10, 2015 Extended European Search Report issued in European Patent Application No. 13195755.7.

* cited by examiner

*Primary Examiner* — William McCalister
(74) *Attorney, Agent, or Firm* — Oliff PLC

(57) ABSTRACT

A pressure reducing valve comprises an open-close valve and a piston. The open-close valve makes switching between connecting and isolating a primary port and a secondary port. The piston makes sliding motion inside the cylinder according to a difference between force applied from the pressure regulating chamber and force applied from the pressure reducing chamber, thereby opening and closing the open-close valve. The open-close valve includes a valve stem and a valve seat fixing member. The valve seat fixing member restrains displacement of the piston toward a side upstream of the open-close valve by abutting on an end surface of the piston. The valve seat fixing member includes a channel hole communicatively connecting a housing part for the valve stem and the pressure reducing chamber.

2 Claims, 2 Drawing Sheets

PRESSURE REDUCING VALVE

BACKGROUND OF THE INVENTION

This invention relates to a pressure reducing valve used to regulate the pressure of high-pressure gas such as hydrogen gas.

A pressure reducing valve includes an open-close valve arranged between a primary port and a secondary port. Opening and closing the open-close valve causes inflow of high-pressure gas through the primary port, and the gas reduced in pressure is supplied to outside through the secondary port.

As an example, Japanese Patent Application Publication No. 2011-108057 discloses a pressure reducing valve including a primary chamber communicating with a primary port, a secondary chamber communicating with a secondary port, and an open-close valve that makes switching between connecting and isolating the primary and secondary chambers. The open-close valve includes a valve stem, a valve seat fixing member, a valve seat member, a housing, a valve element, a valve spring, and a lid member. A valve seat placement part is provided in the housing. While the valve seat member is placed in the valve seat placement part, the valve seat fixing member is fitted to the housing by threads, thereby fixing the valve seat member to the valve seat placement part.

An upper part of the valve seat fixing member is arranged in the secondary chamber. The secondary chamber houses a piston and a piston spring. The piston is always biased by the piston spring toward the primary chamber. The valve stem is housed inside the valve seat fixing member. An upper end of the valve stem always abuts on a lower end of the piston. The lid member is fixed to the primary chamber of the housing. The valve element is supported by a lower end of the valve seat member and an upper end of the lid member inside the housing.

The valve element is always biased downstream by the biasing force of the valve spring arranged between the valve element and the lid member. An upper end of the valve element always abuts on a lower end of the valve stem. The valve element contacts or separates from the valve seat member in response to a difference between force acting from the secondary chamber toward the primary chamber and force acting from the primary chamber toward the secondary chamber, thereby switching between connecting and isolating the primary and secondary chambers.

In the case of the pressure reducing valve of Japanese Patent Application Publication No. 2011-108057, the valve seat fixing member fixing the valve seat member has a channel groove formed in an end surface facing the piston. The channel groove extends along the radial direction of the housing. Even if the valve element is fully open, specifically even if the piston abuts on the end surface of the valve seat fixing member, this channel groove ensures a channel for high-pressure gas to flow from the primary port toward the secondary port.

However, forming the channel groove in the valve seat fixing member reduces the strength of the end surface of the valve seat fixing member in an area where the channel groove is formed, compared to the case where the channel groove is not formed in the valve seat fixing member. Hence, when the piston contacts the valve seat fixing member to make the valve element open fully, the end surface of the valve seat fixing member in the area where the channel groove is formed might be worn easily. This might make wear debris mix in between the valve seat and the valve element, probably making it impossible to ensure hermeticity between the primary and secondary ports. This might be a cause for gas leakage to occur between the primary and secondary ports.

SUMMARY OF THE INVENTION

An object of this invention is to provide a pressure reducing valve capable of suppressing gas leakage that occurs between a primary port and a secondary port.

In order to solve the aforementioned problem, a first aspect of this invention provides a pressure reducing valve. The pressure reducing valve comprises: an open-close valve that makes switching between connecting and isolating a primary port and a secondary port provided in a body member; a cylinder arranged downstream of the open-close valve, the cylinder communicating with the secondary port; and a piston dividing the cylinder into a pressure reducing chamber and a pressure regulating chamber, the piston making sliding motion inside the cylinder according to a difference between force applied from the pressure regulating chamber and force applied from the pressure reducing chamber, thereby opening and closing the open-close valve. The open-close valve includes a valve stem interposed between the open-close valve and the piston, and a plug that restrains displacement of the piston toward a side upstream of the open-close valve by abutting on an end surface of the piston. The plug has a function of housing the valve stem. The plug includes a channel hole communicatively connecting a housing part for the valve stem and the pressure reducing chamber.

DETAILED DESCRIPTION OF THE PREFERRED EMBODIMENTS

An embodiment that embodies a pressure reducing valve of this invention is described below by referring to FIGS. 1 to 3.

Figure 1:
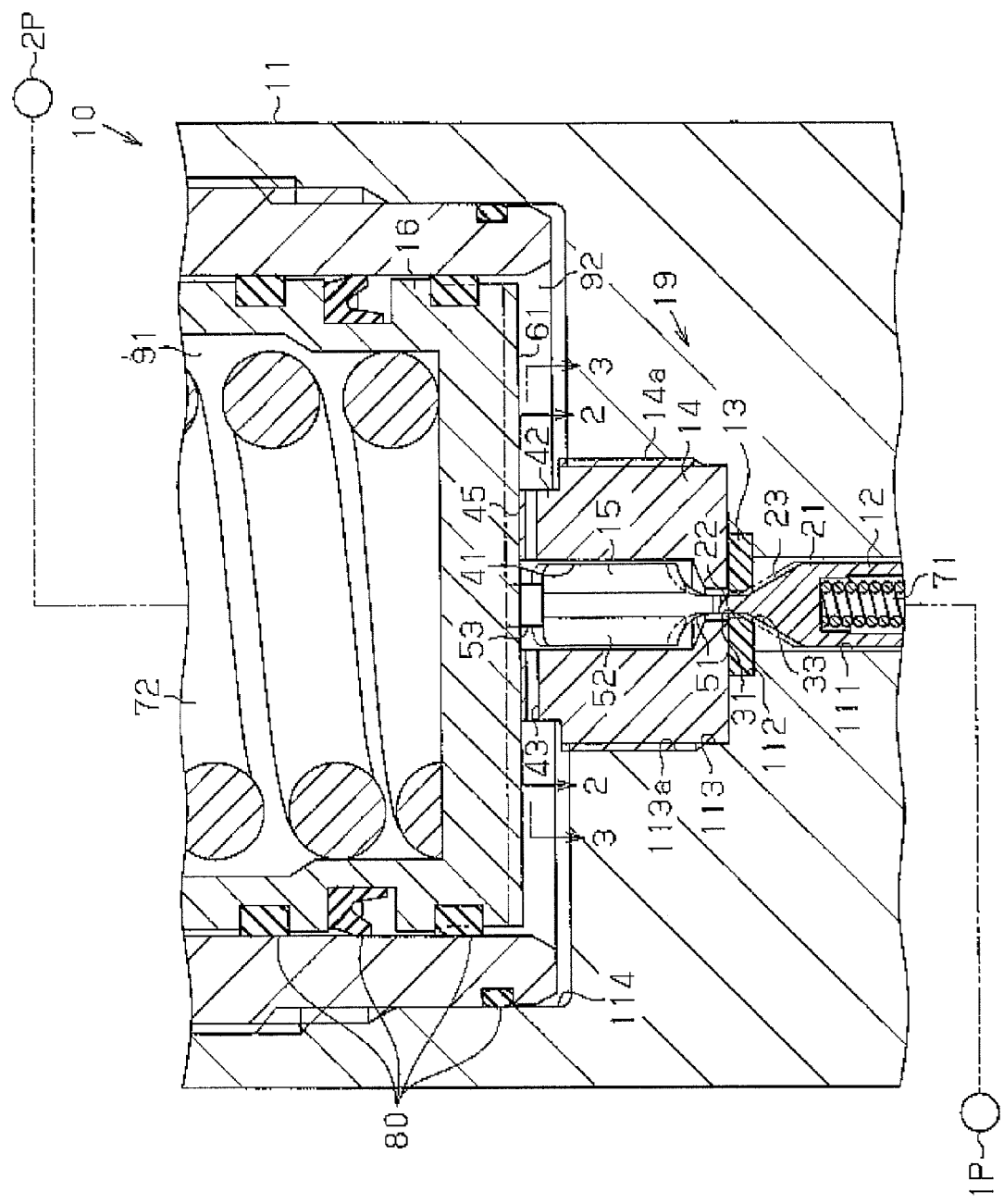
FIG. 1 is a sectional view of a pressure reducing valve of an embodiment of this invention.

As shown in FIG. 1, a pressure reducing valve 10 includes a body member 11 connecting a primary port 1P and a secondary port 2P. The body member 11 houses a valve element 12, a valve seat 13, a valve seat fixing member 14, which serves as a plug, a valve stem 15, and a piston 16.

A first cylindrical part 111, a second cylindrical part 112, a third cylindrical part 113, and a cylinder 114 are formed coaxially inside the body member 11 in this order as viewed from the bottom. The inside diameters of the first to third cylindrical parts 111 to 113 and that of the cylinder 114 are determined so as to increase in the following order: the first cylindrical part 111, the second cylindrical part 112, the third cylindrical part 113, and the cylinder 114. The first cylindrical part 111 communicates with the primary port 1P through a valve not shown in the drawings. The primary port 1P is connected to a supply source for high-pressure gas such as a hydrogen tank.

A screw groove 113a is formed as a first screw part in the inner wall of the third cylindrical part 113. The first cylindrical part 111 houses the metallic valve element 12. The outer diameter of the valve element 12 is slightly smaller than the inside diameter of the first cylindrical part 111. The valve element 12 can move up and down inside the first cylindrical part 111. The valve element 12 is always biased upward by a valve spring 71. The valve element 12 includes a columnar valve element body part 21 and a valve element tip part 22 smaller in outer diameter than the valve element body part 21. The valve element tip part 22 is provided above the valve element body part 21. A valve element tapered part 23 is formed between the valve element body part 21 and the valve element tip part 22. The outer diameter of the valve element tapered part 23 decreases gradually toward the valve element tip part 22. The valve element tip part 22 passes through the second cylindrical part 112 into the third cylindrical part 113.

The second cylindrical part 112 houses the annular valve seat 13 made of synthetic resin. The valve seat 13 has a hole part 31 slightly larger than the outer diameter of the valve element tip part 22. The valve seat 13 has a valve seat tapered part 33 positioned near a lower portion of the hole part 31. The inside diameter of the valve seat tapered part 33 increases gradually toward the bottom. The thickness of the valve seat 13 is slightly greater than the depth of the second cylindrical part 112.

The cylindrical valve seat fixing member 14 is fitted to the third cylindrical part 113 by threads. A screw thread 14*a* is formed as a second screw part in the outer circumferential surface of the valve seat fixing member 14. The valve seat fixing member 14 is made of a metallic material. The bottom surface of the valve seat fixing member 14 abuts on the upper surface of the valve seat 13. Securing the valve seat fixing member 14 with threads 14*a* makes the valve seat fixing member 14 press the valve seat 13 axially (downward in FIG. 1). As a result, the valve seat 13 is held between the valve seat fixing member 14 and the bottom of the second cylindrical part 112. Further, hermeticity is ensured between the bottom of the second cylindrical part 112 and the valve seat 13.

As shown by alternate long and two short dashes lines of FIG. 1, the valve seat 13 may be held between the valve element 12, which is biased by the valve spring 71, and the valve seat fixing member 14. In this case, the valve element tapered part 23 abuts on the valve seat tapered part 33, so that hermeticity is ensured between the tapered part 33 and the valve element tapered part 23. Further, a through hole 41 passing through the valve seat fixing member 14 in an axial direction is formed inside the valve seat fixing member 14. The through hole 41 communicates with the hole part 31 of the valve seat 13. This makes the valve element tip part 22 enter into the valve seat fixing member 14.

Figure 2:
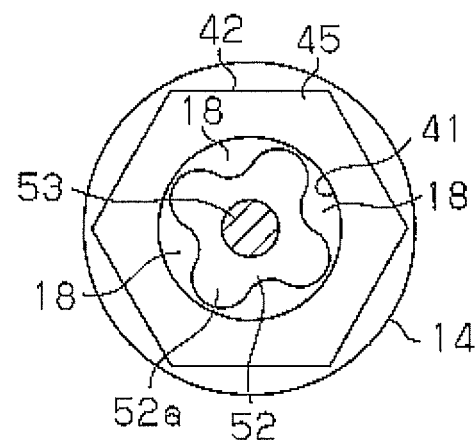
FIG. 2 is a top view taken along line 2-2 of FIG. 1.

As shown in FIG. 2, the valve seat fixing member 14 has a hexagonal upper part 42. The upper part 42 functions as a tool engagement part, and a hexagonal socket, or attachment tool, engages the upper part 42. Rotating the hexagonal socket engaging the upper part 42 causes the threads 14*a* of the valve seat fixing member 14 to engage the corresponding threads 113*a* of the third cylindrical part 113.

Figure 3:
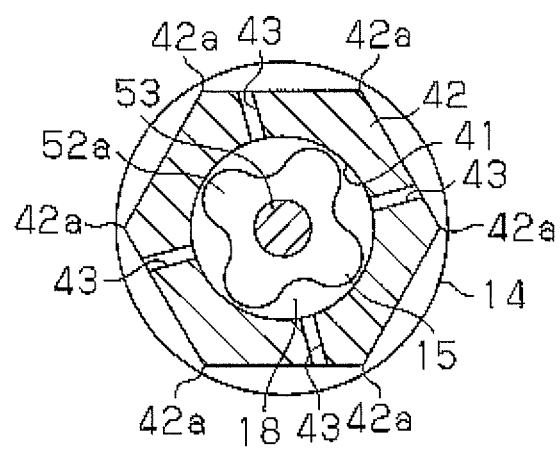
FIG. 3 is a sectional view taken along line 3-3 of FIG. 1.

As shown in FIGS. 1 to 3, four radially extending channel holes 43 are formed in the upper part 42. The four channel holes 43 communicatively connect the through hole 41 and the cylinder 114. The four channel holes 43 are arranged at angular intervals of 90 degrees about the axis of the valve seat fixing member 14. The four channel holes 43 are arranged in positions determined so that corners 42*a* of the upper part 42 do not intersect with the channel holes 43. This ensures strength of engagement between the corners 42*a* of the upper part 42 and the hexagonal socket. An upper end surface 45 of the valve seat fixing member 14 is a flat surface without roughness.

As shown in FIG. 1, the thickness of the valve seat fixing member 14 is greater than the depth of the third cylindrical part 113. This makes the upper part 42 of the valve seat fixing member 14 enter the cylinder 114.

The metallic valve stem 15 is housed in the through hole 41. The valve stem 15 includes a valve stem lower end part 51, which has a truncated cone shape, a valve stem body part 52, and a columnar valve stem upper end part 53. The valve stem body part 52 is provided above the valve stem lower end part 51, and the valve stem upper end part 53 is provided above the valve stem body part 52. The valve stem lower end part 51 abuts on the valve element tip part 22 in the through hole 41.

As shown in FIG. 2, the valve stem body part 52 includes four radially extending lobes 52*a*. The four lobes 52*a* are arranged at intervals of 90 degrees about the axis of the valve stem 15. Four channels 18 are provided in the valve seat fixing member 14. Each of the channels 18 is a space defined by adjacent ones of the lobes 52*a* and the inner wall of the valve seat fixing member 14.

As shown by alternate long and two short dashed lines in FIG. 1, while the valve element tapered part 23 abuts on the valve seat tapered part 33, the valve stem upper end part 53 protrudes from the upper part of the valve seat fixing member 14 to enter the cylinder 114. The body member 11, the valve element 12, the valve seat 13, the valve seat fixing member 14, the valve stem 15, and the valve spring 71 form an open-close valve 19.

The cylinder 114 houses the piston 16, which moves axially (up and down in FIG. 1). The piston 16 is made of a metallic material and is formed into a cylindrical shape. Various sealing members 80 are interposed between the inner wall of the cylinder 114 and the piston 16. The various sealing elements 80 ensure hermeticity between the inner wall of the cylinder 114 and the piston 16. The piston 16 divides the space inside the cylinder 114 into two parts. A pressure regulating chamber 91 and a pressure reducing chamber 92 are provided above and below the piston 16 respectively.

The piston 16 houses a piston spring 72 inside. The piston 16 is always biased downward by the piston spring 72. The biasing force of the piston spring 72 is determined to be greater than that of the valve spring 71. This causes a lower end surface 61 of the piston 16 to always abut on valve stem upper end part 53. The lower end surface 61 of the piston 16 is a flat surface without roughness. The diameter of the lower end surface 61 of the piston 16 is determined to be greater than the outer diameter of the upper end surface 45 of the valve seat fixing member 14. This allows the lower end surface 61 of the piston 16 to abut on the upper end surface 45 of the valve seat fixing member 14. Abutting contact between the lower end surface 61 of the piston 16 and the upper end surface 45 of the valve seat fixing member 14 restrains downward displacement of the piston 16.

The piston 16 moves up and down in response to atmospheric pressure inside the cylinder 114. Specifically, if the atmospheric pressure inside the cylinder 114 increases, the piston 16 moves up against the biasing force of the piston spring 72. If the atmospheric pressure inside the cylinder 114 drops, the piston 16 is moved down by the biasing force of the piston spring 72.

As shown by solid lines of FIG. 1, while the lower end surface 61 of the piston 16 abuts on the upper end surface 45 of the valve seat fixing member 14, the valve element tapered part 23 distances itself from the valve seat tapered part 33. This makes the open-close valve 19 open fully.

With the open-close valve 19 is fully open, upward movement of the piston 16 makes the valve element tapered part 23 approach the valve seat tapered part 33. Then, while the lower end surface 61 of the piston 16 distances itself from the upper end surface 45 of the valve seat fixing member 14, the valve element tapered part 23 abuts on the valve seat tapered part 33, as shown by the alternate long and two short dashes lines of FIG. 1. As a result, the open-close valve 19 is closed. The cylinder 114 communicates with the secondary port 2P through an injector not shown in the drawings.

The operation of the pressure reducing valve is described next.

As shown in FIG. 1, the biasing force of the piston spring 72 acts on the piston 16 axially in a direction from the pressure regulating chamber 91 toward the pressure reducing chamber 92. The biasing force of the valve spring 71 further acts on the piston 16 in an axial direction from the pressure reducing chamber 92 toward the pressure regulating chamber 91. The biasing force of the valve spring 71 is smaller than that of the piston spring 72.

The description of the operation of the pressure reducing valve starts from a condition where the open-close valve 19 is fully open while the lower end surface 61 of the piston 16 abuts on the upper end surface 45 of the valve seat fixing member 14.

High-pressure gas supplied to the pressure reducing valve 10 is introduced into the pressure reducing chamber 92 after passing through the fully-open open-close valve 19, the through hole 41 in the valve seat fixing member 14, and the four channel holes 43. The pressure of the high-pressure gas is reduced in the course of this process, and the gas reduced in pressure is supplied to the secondary port 2P. The pressure of the gas introduced into the pressure reducing chamber 92 presses the piston 16 in an axial direction from the pressure reducing chamber 92 toward the pressure regulating chamber 91. Specifically, the piston 16 is displaced based on the relative magnitudes of the force of the piston spring 72 and the sum of the forces of the gas pressure and the valve spring 71.

More specifically, if the biasing force of the piston spring 72 is smaller than the sum of the force of the gas pressure and the biasing force of the valve spring 71, the piston 16 moves in the upward direction of FIG. 1. In response, the valve stem 15 and the valve element 12 move upward to close the open-close valve 19. If the biasing force of the piston spring 72 is greater than the sum of the force of the gas pressure and the biasing force of the valve spring 71, the piston 16 moves in the downward direction of FIG. 1. In response, the valve stem 15 and the valve element 12 move downward to open the open-close valve 19.

When the supply of the high-pressure gas to the pressure reducing valve 10 stops, the biasing force of the piston spring 72 becomes greater than the sum of the force of the gas pressure and the biasing force of the valve spring 71. As a result, the piston 16 moves down. The lower end surface 61 of the piston 16 eventually abuts on the upper end surface 45 of the valve seat fixing member 14. The lower end surface 61 of the piston 16 and the upper end surface 45 of the valve seat fixing member 14 are both flat surfaces, so that they come into surface-contact with each other.

Thus, an impact caused by the contact between the piston 16 and the valve seat fixing member 14 is dispersed through the entire contact surface. This means that the impact caused by the contact between the piston 16 and the valve seat fixing member 14 is not applied intensively to a limited part of the valve seat fixing member 14, thereby suppressing generation of wear debris. Thus, a mixture of wear debris in the first cylindrical part 111 is suppressed. Specifically, a mixture of wear debris in between the valve element tapered part 23 of the valve element 12 and the valve seat tapered part 33 of the valve seat 13 is suppressed. This makes it possible to ensure hermeticity between the valve element 12 and the valve seat 13, allowing suppression of gas leakage from between the valve element 12 and the valve seat 13.

The number of the lobes 52a is the same as that of the channel holes 43, so that there is one-to-one correspondence between the channels 18 and the channel holes 43. Further, the four lobes 52a and the four channel holes 43 are arranged about the axis of the valve stem 15 and that of the valve seat fixing member 14, respectively, both at angular intervals of 90 degrees. According to this structure, when gas is supplied to the through hole 41, the valve stem 15 rotates in a way that makes the positions of the channels 18 correspond to those of the channel holes 43, as shown in FIG. 3. In other words, the valve stem 15 rotates such that the lobes 52a do not block the channel holes 43. This reduces pressure loss that might otherwise occur when gas flows from the channels 18 into the channel holes 43.

The aforementioned embodiment achieves the following effects.

(1) The channel holes 43 connecting the through hole 41 and the pressure reducing chamber 92 are formed in the valve seat fixing member 14. This structure makes it unnecessary to provide a groove serving as a channel for gas in the upper end surface 45 of the valve seat fixing member 14 abutting on the piston 16. In this case, the lower end surface 61 of the piston 16 and the upper end surface 45 of the valve seat fixing member 14 come into surface-contact with each other. Thus, an impact caused by the contact between the piston 16 and the valve seat fixing member 14 is dispersed through the entire contact surface. This suppresses wear caused by the contact between the piston 16 and the valve seat fixing member 14. Thus, a mixture of wear debris in the first cylindrical part 111 is suppressed. Specifically, accumulation of a mixture of wear debris between the valve element tapered part 23 of the valve element 12 and the valve seat tapered part 33 of the valve seat 13 is reduced. This makes it possible to ensure hermeticity between the valve element 12 and the valve seat 13, so that the pressure of gas to be supplied to the outside is prevented from increasing more than expected.

(2) The valve seat fixing member 14 has the hexagonal upper part 42. This ensures strength of engagement between the corners 42a of the upper part 42 and the hexagonal socket. Further, the four channel holes 43 are arranged in positions that are determined such that the corners 42a of the upper part 42 do not coincide with the channel holes 43. Thus, the channel holes 43 are not blocked when the valve seat fixing member 14 is attached to the third cylindrical part 113. Additionally, there is no probability of removal of the corners 42a, so that the valve seat fixing member 14 can be attached to the third cylindrical part 113 smoothly.

(3) The number of the lobes 52a is the same as that of the channel holes 43, so that the number of the channels 18 becomes the same as that of the channel holes 43. Further, the four lobes 52a and the four channel holes 43 are arranged about the axis of the valve stem 15 and that of the valve seat fixing member 14, respectively, both at intervals of 90 degrees. According to this structure, when gas is supplied to the through hole 41, the valve stem 15 rotates in a way that makes the positions of the channels 18 correspond to those of the channel holes 43, as shown in FIG. 3. In other words, the valve stem 15 rotates such that the lobes 52a do not block the channel holes 43. This avoids a pressure loss that otherwise may occur when gas flows from the channels 18 into the channel holes 43.

The aforementioned embodiment can be changed as follows.

While the number of the channel holes 43 is four in the aforementioned embodiment, it can be any number.

In the aforementioned embodiment, the four channel holes 43 are not necessarily required to be spaced at equal angular intervals.

While the number of the lobes 52*a* is four in the aforementioned embodiment, the number of lobes is not so limited. The lobes 52*a* can be removed from the valve stem 15 as long as a channel is ensured between the valve stem 15 and the valve seat fixing member 14.

In the aforementioned embodiment, the four lobes 52*a* are not necessarily required to be spaced apart at equal angular intervals.

In the aforementioned embodiment, the number of the lobes 52*a* and that of the channel holes 43 are not necessarily required to be the same.

In the aforementioned embodiment, the channel holes 43 may be provided at the corners 42*a* of the upper part 42.

In the aforementioned embodiment, the upper part 42 is not necessarily required to be hexagonal in outer shape. The upper part 42 can be of any shape that allows engagement of the upper part 42 with an attachment tool not shown in the drawings. While a socket is shown as the attachment tool, the attachment tool may also be a wrench and a recessed part to engage the wrench may be formed in the upper part of the valve seat fixing member 14. In this case, the upper part 42 can be circular in outer shape and the valve seat fixing member 14 is fixed to the body member 11 by threads with the attachment tool.

In the aforementioned embodiment, the piston 16 and the valve stem 15 can be integrated.

In the aforementioned embodiment, the valve element 12 and the valve stem 15 can be integrated.

In the aforementioned embodiment, the gas to be reduced in pressure by the pressure reducing valve is hydrogen gas. However, the gas to be reduced in pressure may be gas other than hydrogen gas such as oxygen or nitrogen gas. The gas to be reduced in pressure can be gas composed of multiple elements as well as gas composed of a single element.

The invention claimed is:

1. A pressure reducing valve, comprising:
an open-close valve that switches between connecting and isolating a primary port and a secondary port provided in a body member;
a cylinder arranged downstream of the open-close valve, the cylinder communicating with the secondary port; and
a piston that divides the cylinder into a pressure reducing chamber and a pressure regulating chamber, wherein
the piston moves inside the cylinder according to a difference between force applied from the pressure regulating chamber and force applied from the pressure reducing chamber, thereby opening and closing the open-close valve,
the open-close valve includes a valve stem, which is located between the open-close valve and the piston, and a plug, which restrains displacement of the piston toward an upstream side of the open-close valve by abutting on an end surface of the piston,
the plug houses the valve stem,
the plug includes a channel hole, through which a housing part for the valve stem communicates with the pressure reducing chamber,
a tool engagement part is provided at a downstream end portion of the plug,
the tool engagement part is formed in a polygonal shape having corners so that the tool engagement part engages a tool,
the tool engagement part is arranged around an axis of the plug,
a first screw part is formed in the body member,
a second screw part, which is threaded to the first screw part, is formed in the plug,
while the first screw part is threaded to the second screw part, the tool engages the tool engagement member, thereby attaching the plug to the body member, and
the channel hole is formed in a range of an axial length of the tool engagement part.

2. The pressure reducing valve according to claim 1, wherein the channel hole is one of multiple channel holes.

* * * * *